Figures 1, 2:
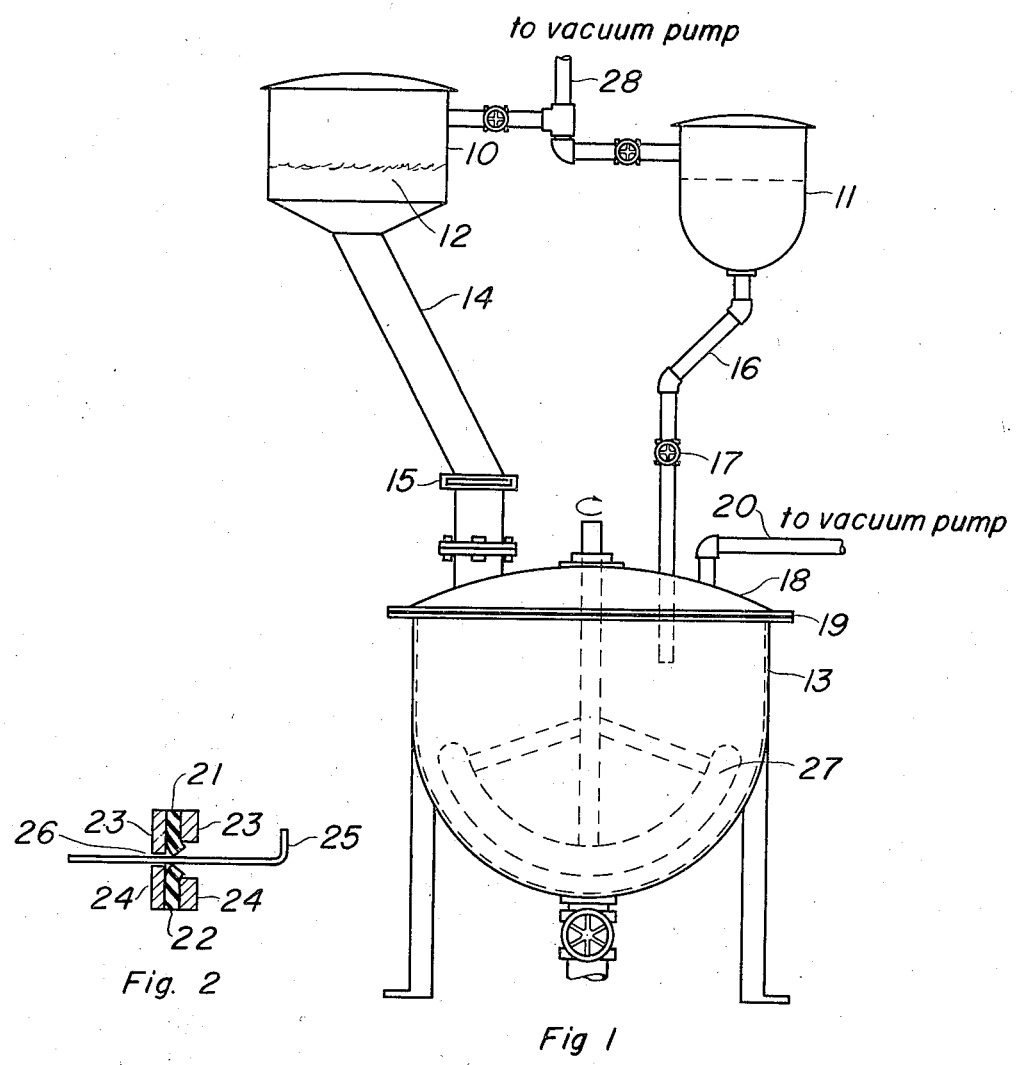

April 11, 1939.　　　W. I. McGOWAN　　　2,153,970

VACUUM PREPARATION OF COMPOUNDS

Filed May 29, 1935

Inventor
William I. McGowan
By Theodore C. Browne
Attorney

Patented Apr. 11, 1939

2,153,970

UNITED STATES PATENT OFFICE 2,153,970

VACUUM PREPARATION OF COMPOUNDS

William I. McGowan, Cambridge, Mass., assignor to Dewey and Almy Chemical Company, North Cambridge, Mass., a corporation of Massachusetts Application May 29, 1935, Serial No. 24,086

5 Claims. (Cl. 134—17)

This invention relates to container sealing compositions and to the manner of their manufacture and has for its objects to produce sealing compositions which are much less subject to failure than formerly and to remove gas bubble nuclei from such compositions.

These and other objects will become apparent from the specification and from the drawing in which Figure 1 indicates diagrammatically the apparatus in which my process may be performed and Fig. 2 shows in sectional elevation, an air proof material gate.

In the sealing of cans by the double seam process, certain seals fail despite the greatest care given to the nature of the compound, its suitability for the particular seal, and its plasticity. Although the incidence of failure is but a very small fraction of a per cent, any failure has extremely serious effects since food products are involved.

Again, when lined caps are applied to glass jars certain hitherto unaccountable failures have occurred.

I have determined that such failures are due to breaks in the continuity of the sealing element. To explain: After the sealing compound has been deposited in the channel and dried, the action of the closing rolls not only compresses the compound, but stretches it radially as the metal is extended and flowed into the double seam. Any small air bubble which may exist therein is stretched into a tube-like channel which may extend from the atmosphere to the contents.

In the case of jar caps, failures sometimes occur for a like reason, for after the compound has been applied to the caps, they are heated to dry the compound and often to cure it. If a small bubble of air exists in the compound when applied, it expands. When the caps cool, the air in the bubble shrinks and ordinarily the compound assumes a perfectly normal appearance. It is, then, almost impossible for an inspector to detect the defect. Since the seal is dependent upon pressure applied to the glass and cap through the medium of the compound, sealing pressure will not be applied across the area occupied by a bubble. Such seals fail.

Modern cap compounds are extremely viscous, since they are formed of concentrated latex containing foam forming substances or casein as stabilizers for the latex, and air, once whipped into the mixture cannot be eliminated.

I have discovered that practically air free compounds may be made by mixing the compound in the apparatus illustrated in Fig. 1 or in other suitable manners excluding air as the latex and compounding ingredients are commingled. Thereafter if reasonable care is taken in handling the compound, air is not reintroduced.

In Fig. 1, 10 represents a bin in which the mixed dry ingredients are stored. Water is first placed in the tank 11. The solid ingredients 12 are fed into the vacuum mixing chamber 13 through the conduit 14 and are controlled by means of the gate 15. Then the water from the tank 11 is fed to the mixer 13 through the pipe 16 and controlled by means of the valve 17. The cover 18 of the vacuum mixing chamber 13 seats in an air tight manner against the gasket 19. The pipe connection 20 leads to a suitable vacuum pump (not shown). The gate 15 is made sufficiently air tight by means of the two rubber members 21 and 22 held by the clamps 23, 23 and 24, 24. These press inwardly and downwardly against the gate plate 25 and shut off air from entering along the channel 26 and into the conduit 14. When the solids and water have been thoroughly mixed, the tank 11 is filled with latex and this in turn is added to the mass in the mixing chamber 13.

With the apparatus which I have described, no air will be whipped into the plastic mass by the paddle 27.

The terminii of the conduits 14 and 16 within the vacuum chamber are materially above any level assumed by the charge. Thus liquids falling from the conduit 16 into the vacuum chamber 13 fall a considerable distance, in the preferred form of apparatus about 3 feet, before striking the accumulated liquid in the container. Powders falling from the conduit 14 also drop through approximately the same distance.

Before the gate 15 and valve 17 are opened, a substantial vacuum is pulled in the chamber 13. The substances present an extended surface during their fall and give up a major portion of their supply of entrained air before merging with the mass in the bottom of the container.

In certain instances, particularly where fluffy powders and foam forming latices must be mixed, it is desirable to de-gas the powder and the latex by a preliminary vacuum treatment in the containers 10 and 11. The vacuum is developed through the connection 28. Stirring of the liquid in the container 11 and agitation of the powder in container 12 will frequently prove helpful.

The usefulness of this method of mixing is by no means confined to container sealing compounds, but is generally useful where compounded latices are subsequently exposed to heat and porosity must be avoided.

I claim:

1. That method of compounding a concentrated latex with solid ingredients which comprises forming a water slurry of said ingredients, exhausting air from the slurry and then adding latex to the air-free slurry while maintaining a materially reduced atmospheric pressure on said slurry and latex.

2. That method of compounding a concentrated latex which comprises separately subjecting the latex and the compounding ingredients to substantially reduced pressures and then adding and mixing the two together in the absence of any substantial quantity of air.

3. The method of producing substantially air free mixtures of latex containing a foam-forming substance as a stabilizer and comminuted substances which consists in forming a water slurry of said comminuted substances, exhausting air from the slurry and then mixing the latex with the air-free slurry while maintaining a materially reduced atmospheric pressure on said slurry and latex.

4. The method of mixing comminuted substances with latex containing a foam-producing stabilizer to produce a substantially air-free mixture which consists in subjecting the latex and the comminuted substances separately to a vacuum to exhaust air therefrom, and then mixing together the latex and the comminuted substances while maintaining said mixture under a substantial vacuum.

5. That method of producing substantially air-free mixtures of concentrated latex and comminuted solid substance which includes the steps of introducing the substance and the concentrated latex into a vacuum chamber separately while under vacuum, causing each to develop an extended surface by its free fall within the vacuum chamber while under vacuum, whereby entrained air is given up, and mechanically mixing the concentrated latex and the substance while maintaining a substantial vacuum within said chamber.

WILLIAM I. McGOWAN.